H. M. LAMBERT.
TIRE MOLD.
APPLICATION FILED JAN. 2, 1920. RENEWED FEB. 4, 1921.
1,386,513.
Patented Aug. 2, 1921.
2 SHEETS—SHEET 1.
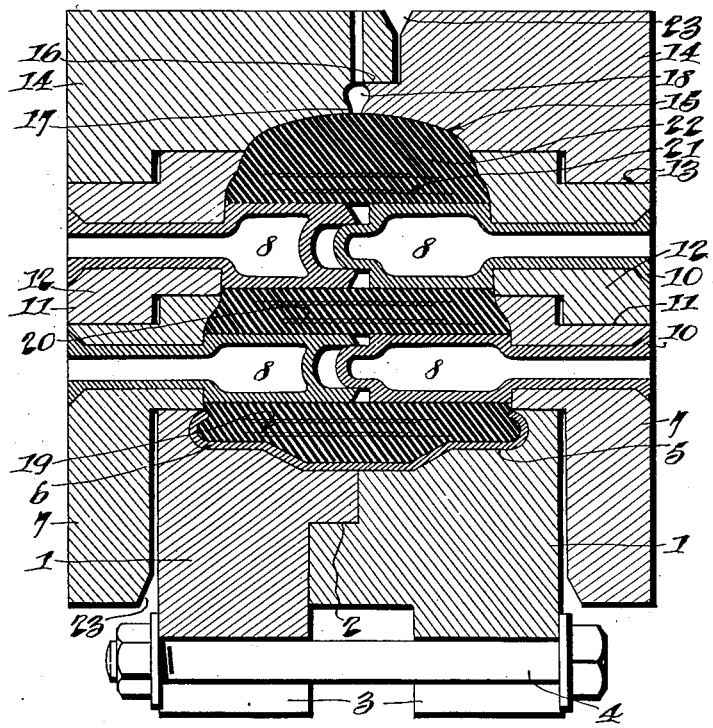
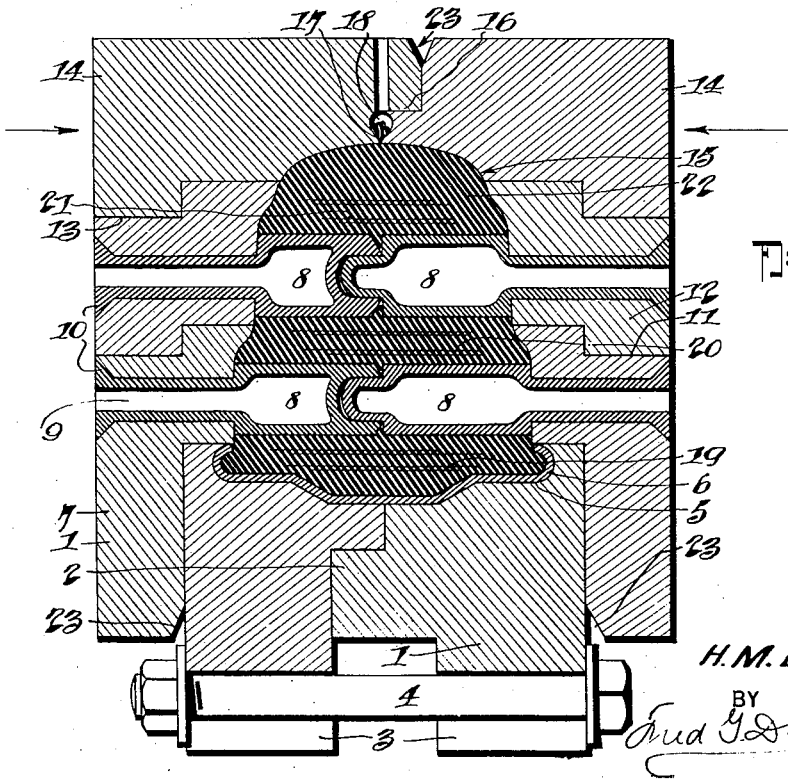
INVENTOR
H. M. Lambert.
BY
Fred G. Dieterich
ATTORNEYS H. M. LAMBERT.
TIRE MOLD.
APPLICATION FILED JAN. 2, 1920. RENEWED FEB. 4, 1921.
1,386,513.
Patented Aug. 2, 1921.
2 SHEETS—SHEET 2.
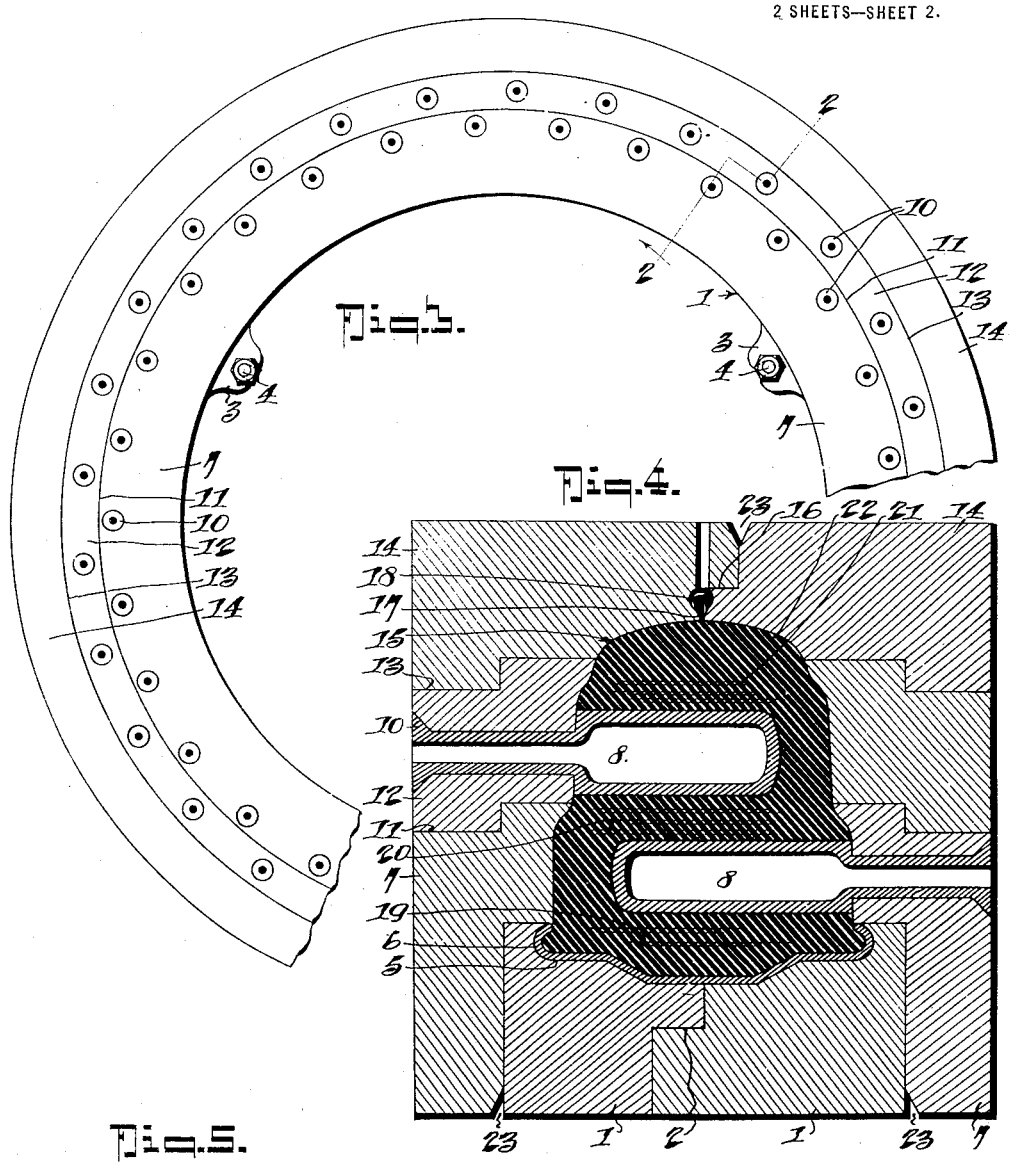
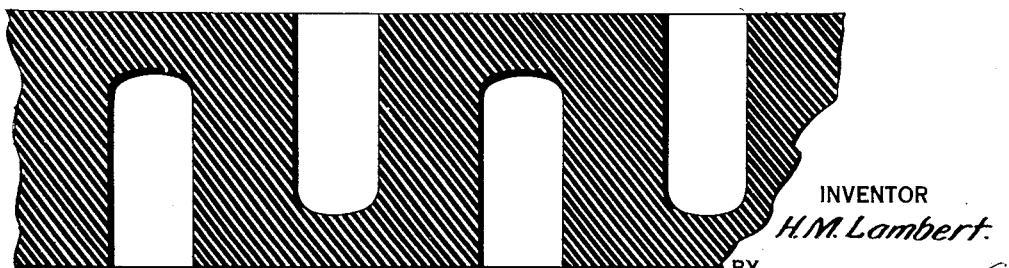
INVENTOR
H. M. Lambert.
BY
Fred G. Dieter
ATTORNEYS

UNITED STATES PATENT OFFICE.

HENRY M. LAMBERT, OF PORTLAND, OREGON.

TIRE-MOLD.

1,386,513.  Specification of Letters Patent.  Patented Aug. 2, 1921.

Application filed January 2, 1920, Serial No. 348,758. Renewed February 4, 1921. Serial No. 442,591.

*To all whom it may concern:*

Be it known that I, HENRY M. LAMBERT, a citizen of the United States, residing at Portland, in the county of Multnomah and State of Oregon, have invented certain new and useful Improvements in Tire-Molds, of which the following is a specification.

My invention relates to the art of tire manufacture and it especially relates to molds in which tires are built up and vulcanized. In its generic nature, the invention has for its object to provide a tire mold of a convenient construction which can be easily assembled in building up the tire and removed from the finished tire with minimum effort.

The invention also has for its object to provide a mold of the sectional type which is easily adapted for the construction of so-called solid tires having transverse recesses or perforations in the body of the tire.

In its more specific nature, the invention includes those novel features of construction, combination and arrangement of parts, all of which will be first fully described, then be specifically pointed out in the appended claims, and illustrated in the accompanying drawings, in which:

Figure 1 is a cross section on the line 2—2 of Fig. 3, showing the position of the parts when the tire has been built up and the mold assembled in building before final pressure in the vulcanizing kettle takes place.

Fig. 2 is a view similar to Fig. 1 showing the position of the parts after the mold has been compressed to the closed position.

Fig. 3 is a detail side elevation of the form of mold shown in Figs. 1 and 2.

Fig. 4 is a view similar to Fig. 2 of a modification of the invention in which tires having transverse recesses instead of transverse perforations is produced.

Fig. 5 is a detail section of a portion of a tire such as produced by the mold shown in Fig. 4.

In the drawings, in which like numerals of reference indicate like parts in all of the figures, 1—1 designate the two annular base sections of the mold which are lap-jointed at 2 and provided with lugs 3 to receive tie bolts 4 by means of which the sections 1—1 are held together. The sections 1—1 are recessed at 5 to receive the rim 6 on which the tire is built up or to form the base portion of the tire. It should be understood that the tire may be built directly in the recess 5 without the use of a rim if desired but preferably a rim is employed on which the tire is built up.

7—7 designate the first of the side mold sections which fit the base sections 1—1 and carry the core members 8—8, the latter in the form shown in Figs. 1 to 3, inclusive, being of the male and female type to form, when assembled, transverse perforations in the tire structure. 12 indicates the intermediate side plates which are stepped at 11 and 13 to fit the adjacent side plates 7 and 14, respectively. The core members 8 are provided with shanks 9 which are secured to the side plates 7 and 12 by having their ends riveted over as at 10.

The side plates 7 have their annular edges stepped as at 13 to coöperate with the outer set of mold plates 14 which may be provided with the tread form surface 15. The outer mold plates 14 are lap-jointed as at 16, and provided with recesses with converging edges 17 to form a pocket 18 in which excess rubber will flow and be cut off. The plates 7 and 12 and 14 are in the nature of rings, the plates 7 and 12 forming the side plates of the mold while the plates 14 constitute the tread plates of the mold.

My invention has been especially designed for building what is known as "Lambert Trublpruf tires" which tires consist of a plurality of stretchless belts arranged concentrically and interposed slabs of rubber with transverse perforations.

In using my invention the rim 6 (when the tire is to be built up on the rim) is placed between the base sections of the mold 1—1 and the latter are clamped together by the bolts 4 to hold the rim in place. The first stretchless belt 19 of the tire is now built up in the rim in the usual way; after which, the first set of mold plates 7—7 is placed into position, rubber blocks being inserted between adjacent pairs of core bars or lugs 8 and then the second endless belt structure 20 is built up around the same, after which the second set of mold plates 12 is put into position, the spaces between the lugs 8—8 carried by the set being then filled with rubber, and then the tread belt 21 is built on and subsequently the tread 22 is formed on the tire, after which the tread molding plates 14 are placed in position. The parts will then be in the position shown in Fig. 1. The mold is then laid in a vulcanizing kettle having provision for pressing the mold plates together in the direction of the arrows in Fig. 2 until the plates are pressed together to their maximum degree, when the parts will be positioned as shown in Fig. 2. Vulcanization is allowed to take place while the parts are in this position and the tire is then completed, as will be clear to those skilled in the art. After the vulcanization, it is an easy matter to remove the sections of the mold. To facilitate this, the mold may be provided at suitable places with pinch bar recesses 23 in which a tool may be placed to prize the mold sections apart. The bolts 4 are removed and the sections 1—1 are separated, whereupon the tire will be released from the mold.

It should be understood that the core lugs 8—8 may be either of solid material or may be hollow, as shown in the drawings and I do not wish to be confined to either hollow or solid core lugs.

Instead of arranging the lugs 8—8 on the respective plates 7—7 to constitute male and female members they may be staggered and may be shorter so as not to penetrate clear through the tire as shown in Fig. 4, in which event a tire structure such as indicated in Fig. 5 will be produced.

It will be observed that by the use of my construction of mold, building up of the tire is facilitated and when the tire has been completed the removal of the mold parts may be readily effected.

From the foregoing description, taken in connection with the accompanying drawings, it is thought the complete construction, operation and advantages of my invention will be readily understood.

What I claim is:—

1. In tire molds, a base section consisting of opposed annular ring plates having a recess to conform to the base of the tire, a plurality of sets of concentrically disposed annular side plates and a set of tread molding plates, said plates being coöperatively engaged, and sets of lugs carried by the respective side plates to project into the mold cavity and thereby form spaces in the tire.

2. In a tire mold, the combination with base forming sections and tread forming sections of side forming members each consisting of a plurality of annular ring plates coöperatively engaging one another and lugs carried by the side ring plates to project into the cavity of the mold and thereby form spaces in the tire structure, substantially as shown and described.

3. In a tire mold, the combination with base forming sections and tread forming sections of side forming members each consisting of a plurality of annular ring plates coöperatively engaging one another and lugs carried by the side ring plates to project into the cavity of the mold and thereby form spaced in the tire structure, the lugs of oppositely disposed ring plates coöperating with one another as male and female.

4. In a tire mold, in combination with a base and tread forming plates, of separable section side plates and lugs relatively fixed to said side plates and projecting into the chamber of the mold, substantially as shown and for the purpose described.

5. In a tire mold, a base forming structure consisting of opposing annular rings lap-jointed together, a tread forming structure also composed of a pair of lap-jointed annular rings, and side forming elements coöperating with the base and tread forming elements, and lugs fixedly carried by said side forming elements, and projecting into the cavity of the mold, substantially as shown and for the purpose described.

6. In tire molds, the combination with the mold plates for forming the sides and tread of the tire, sets of lugs carried respectively by the side plates to project into the mold cavity, the lugs at one side opposing the lugs of the opposite side, there being a plurality of lugs in each set spaced apart around the mold.

7. In tire molds, the combination with the mold plates for forming the sides and tread of the tire, sets of lugs carried respectively by the side plates to project into the mold cavity, the lugs at one side opposing the lugs of the opposite side, said opposing lugs having male and female connection.

HENRY M. LAMBERT.